US007003897B1

(12) United States Patent
Lingle et al.

(10) Patent No.: US 7,003,897 B1
(45) Date of Patent: Feb. 28, 2006

(54) COFFEE ROASTER DRUM ROCKER ARM ROLLER BEARING SYSTEM

(76) Inventors: James B. Lingle, 6500 S. Garfield, Bell Gardens, CA (US) 90201; Alexandru Scantee, 6500 S. Garfield, Bell Gardens, CA (US) 90201

( * ) Notice: Subject to any disclaimer, the term of this patent is extended or adjusted under 35 U.S.C. 154(b) by 0 days.

(21) Appl. No.: 10/998,097

(22) Filed: Nov. 29, 2004

(51) Int. Cl.
*F26B 11/02* (2006.01)

(52) U.S. Cl. .............................. 34/499; 34/108; 34/601; 34/360

(58) Field of Classification Search .................. 34/261, 34/318, 425, 499, 63, 108, 117, 601, 603, 34/201, 360; 426/594, 595, 466; 99/286, 99/323, 421 H
See application file for complete search history.

(56) References Cited

U.S. PATENT DOCUMENTS 4,344,596 A * 8/1982 Hjaeresen .................. 248/550
5,044,786 A * 9/1991 Jacob et al. ................. 384/549
5,068,979 A * 12/1991 Wireman et al. ............... 34/58
5,638,607 A * 6/1997 Lemme et al. ................. 34/136
6,195,912 B1 * 3/2001 Moon et al. .................. 34/577
6,324,770 B1 * 12/2001 Moon et al. .................. 34/577

* cited by examiner

*Primary Examiner*—Kenneth Rinehardt
(74) *Attorney, Agent, or Firm*—Richard B. Main

(57) ABSTRACT

A coffee roaster is an oven with a roasting drum. The roasting drum turns on a horizontal axis within the oven to tumble coffee beans while roasting and to even out differences in heating. The roasting drum is fitted with a bearing journal at each end and just fits within the length of the oven. Opposite ends of the oven have four rollers each that receive the turning weight of the roasting drum by riding along the bearing journals. Each roller wheel is carried at the distal end of a rocker arm attached by its near end to the lower end wall of the oven below a corresponding drum opening. Each in a set of four roller wheels are height adjustable at the 4-o'clock, 5-o'clock, 7-o'clock, and 8-o'clock positions. The two outer rockers and wheel rollers adjust the lateral position of the roasting drum in the oven, and the two inner ones adjust the vertical height of rotation within the oven.

7 Claims, 3 Drawing Sheets

COFFEE ROASTER DRUM ROCKER ARM ROLLER BEARING SYSTEM

BACKGROUND OF THE INVENTION

1. Field of the Invention

The present invention relates to coffee roasting equipment, and more particularly to upgrades to existing coffee roaster equipment that will restore and lengthen their service lives.

2. Description of Related Art

Coffee beans were once roasted in open pans held over fires to prepare them for grinding and use in making coffee to be drunk. The first commercial roasters were set into brick kilns that would hold and contain heat from a wood-fired source. Cast iron drum roasters were also used. Conductive heat transfer is used almost exclusively to roast coffee. The coffee picked up heat by direct contact with the hot metal surfaces of the roaster.

Roasting of this type offered little control. Coffee was often roasted too dark, and was very uneven in the degree of roast from bean to bean, since all the coffee could not possibly have the same amount of contact with the hot metal surfaces of the roaster. Jabez Burns invented a roaster in the 1870's that used a perforated metal drum. Such allowed the chaff to separate and convective air flows to circulate around each bean. Hot convective air and radiant heat from the burners and hot metal of the roaster all heated the coffee. Coffee could be roasted evenly, and also much lighter. The benefit of roasting lighter was that the coffee lost less weight in the roasting process, and more salable product emerged from the drum than was possible before.

The new convective system also allowed a longer roast time and better control of the degree of roast. An experienced operator could produce the same roast time and time again, effectively dumping the batch into a stationary cooling bin with an agitator, whereas previous roasters dumped coffee into moving cooling bins wheeled about the factory with no agitation.

The Burns Roaster (Jaebez Burns, Inc., Memphis, Tenn.) was first produced and marketed in 1915. Many roasting operations still prefer this type of batch roaster over more modern ones. So there has evolved a business in restoring and refurbishing the Burns Roasters and others.

Batch roasters can roast 500–600 pounds of green coffee beans at a time, and controlling the roasting temperatures and times is very important in getting good results. Batch drum coffee roasters have either solid drums with convective air flow control, or perforated drums. Roasters now have better flame controls and thermocoupled temperature monitoring, but the progression of the roast is built into the equipment, determined by the metals used, the burners installed, and the cooling system.

For the first few minutes of roasting, the coffee beans stay green, then turn a lighter yellow and emit a grassy smell. The beans start to steam as their internal water content dissipates. Such steam becomes fragrant. A "first crack" will sound off as the real roasting starts to occur. Sugars begin to carmelize, bound-up water escapes, the structure of the bean breaks down, and oils migrate from pockets outward. After the first crack, the roast can be considered complete any time according to taste. The cracking is an audible cue, and it, the look, and smell will all indicate the stage of the roast to an operator.

With darker roasts, carmelization continues, oils migrate, and the beans expand in size as the roast gets darker. Then a "second crack" will be heard, more energetic than the first. Small pieces of bean may be blown away as shrapnel. As the roast becomes very dark, the smoke given off will be more pungent as the bean structure breaks down and the sugars burn. If the sugars are allowed to burn completely, the roast will be ruined.

More specifically, the light brown stage typically occurs at 250–300° F. internal bean temperature. The coffee will have a toasted grain or baked bread smell. Up until first crack the coffee is undergoing an endothermic reaction, taking on heat, but as it undergoes first crack the reaction becomes exothermic, releasing heat/energy. The first crack begins at a 355° F. internal bean temperature. A city roast is achieved at a 400–415° F. A full city roast is had at a 415–425° F. internal bean temperature. For Vienna roast, a 450–465° F. is needed. A full French roast or Italian roast is reached at 475–510° F. internal bean temperature. Sugars are heavily caramelized and begin to be degraded. The woody bean structure carbonizes, the seed continues to expand and loose mass, and the flavor body of the resulting beverage will be thinner and lighter because the aromatic compounds, oils, and soluble solids are burned out of the coffee as smoke. A Spanish roast, with a 520–530° F. internal bean temperature, gets very close to flashing into a fire. Beyond this, the coffee's flavor-contributing compounds will be severely degraded because the cellular matrix of the coffee is completely ruptured, and the soluble solids content of the coffee is vaporized, e.g., a "third crack".

SUMMARY OF THE INVENTION

Briefly, a coffee roaster embodiment of the present invention comprises an oven with a roasting drum. The roasting drum turns on a horizontal axis within the oven to tumble coffee beans while roasting and to even out differences in heating. The roasting drum is fitted with a bearing journal at each end and just fits within the length of the oven. Opposite ends of the oven have four rollers each that receive the turning weight of the roasting drum by riding along the bearing journals. Each roller wheel is carried at the distal end of a rocker arm attached by its near end to the lower end wall of the oven below a corresponding drum opening. Each of the four roller wheels is height adjustable at the 4-o'clock, 5-o'clock, 7-o'clock, and 8-o'clock positions. The two outer rockers and wheel rollers adjust the lateral position of the roasting drum in the oven, and the two inner ones adjust the vertical height of rotation within the oven.

An advantage of the present invention is a roaster is provided with increased service life.

Another advantage of the present invention is that a roaster is provided that needs little or no drum lubrication.

A still further advantage of the present invention is that a rocker roller is provided for a roaster that can be retrofitted to replace a troublesome and quick-wearing Babbitt-type bearing.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1:
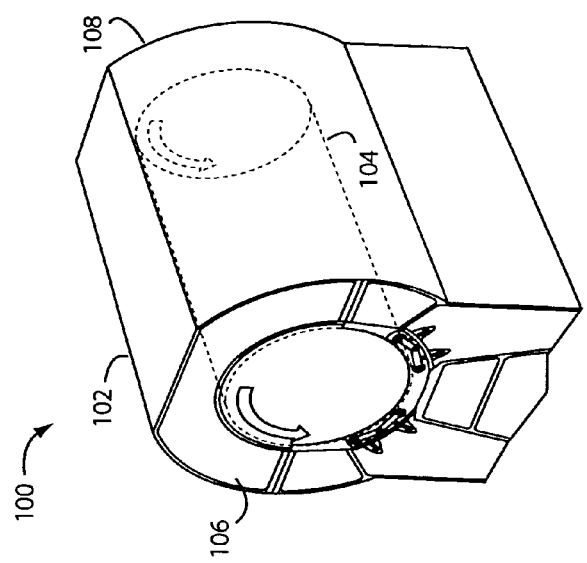
FIG. 1 is a perspective view diagram of a coffee roaster embodiment of the present invention.

FIG. 1 illustrates a coffee roaster embodiment of the present invention, and is referred to herein by the general reference numeral 100. The coffee roaster 100 comprises an oven 102 with a rotating roasting drum 104. The oven 102 is generally constructed of cast iron and provides both hot air convection and radiant heat, e.g., from natural gas or propane burners. Coffee beans in batches can be introduced and withdrawn from open ends provided in the roasting drum 104. The oven 102 has opposite wall ends 106 and 108 that each provide support for the rotating weight of each end of the roasting drum 104.

Figure 2:
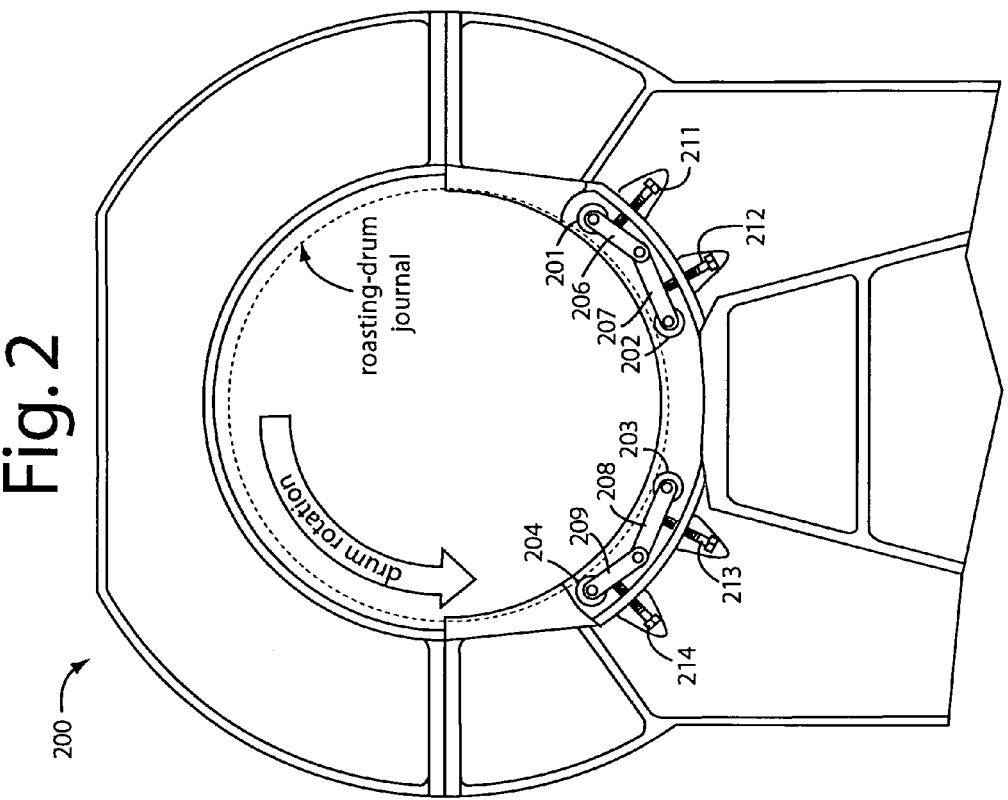
FIG. 2 is an end view diagram of the coffee roaster embodiment of the present invention of FIG. 1, and shows the 4-o'clock, 5-o'clock, 7-o'clock, and 8-o'clock positions of the roller bearings that enable the lateral and vertical repositioning of the roasting drum in the oven.

FIG. 2 represents a coffee roaster embodiment of the present invention like that of FIG. 1, and is referred to herein by the general reference numeral 200. The coffee roaster 200 has a set of four roller bearing wheels 201–204 respectively set at the 4-o'clock, 5-o'clock, 7-o'clock, and 8-o'clock positions. Each roller bearing wheel 201–204 is fitted to a distal end of corresponding rocker arms 206–209. These rocker arms are adjustable by respective set-screw adjustments 211–214. Such provides for the lateral and vertical repositioning of the roasting drum in the oven, e.g., drum 104 in oven 102 as shown in FIG. 1.

Other ways of providing for the adjustment of roller bearing wheels 201–204 could no doubt be designed by an artisan once the present disclosure was understood. The 4-o'clock, 5-o'clock, 7-o'clock, and 8-o'clock positions mentioned herein are only approximate, and different arrangements could be made here too.

If the machine tolerances of the oven and roasting drum were held tight enough, no adjustment would be necessary. But that is not really practical in the coffee roasting application where cast iron parts are used at high temperatures. When embodiments of the present invention are used as ways to restore and refurbish worn machines by replacing their Babbitt-type drum bearings, then such adjustability becomes a critical necessity.

Figure 3:
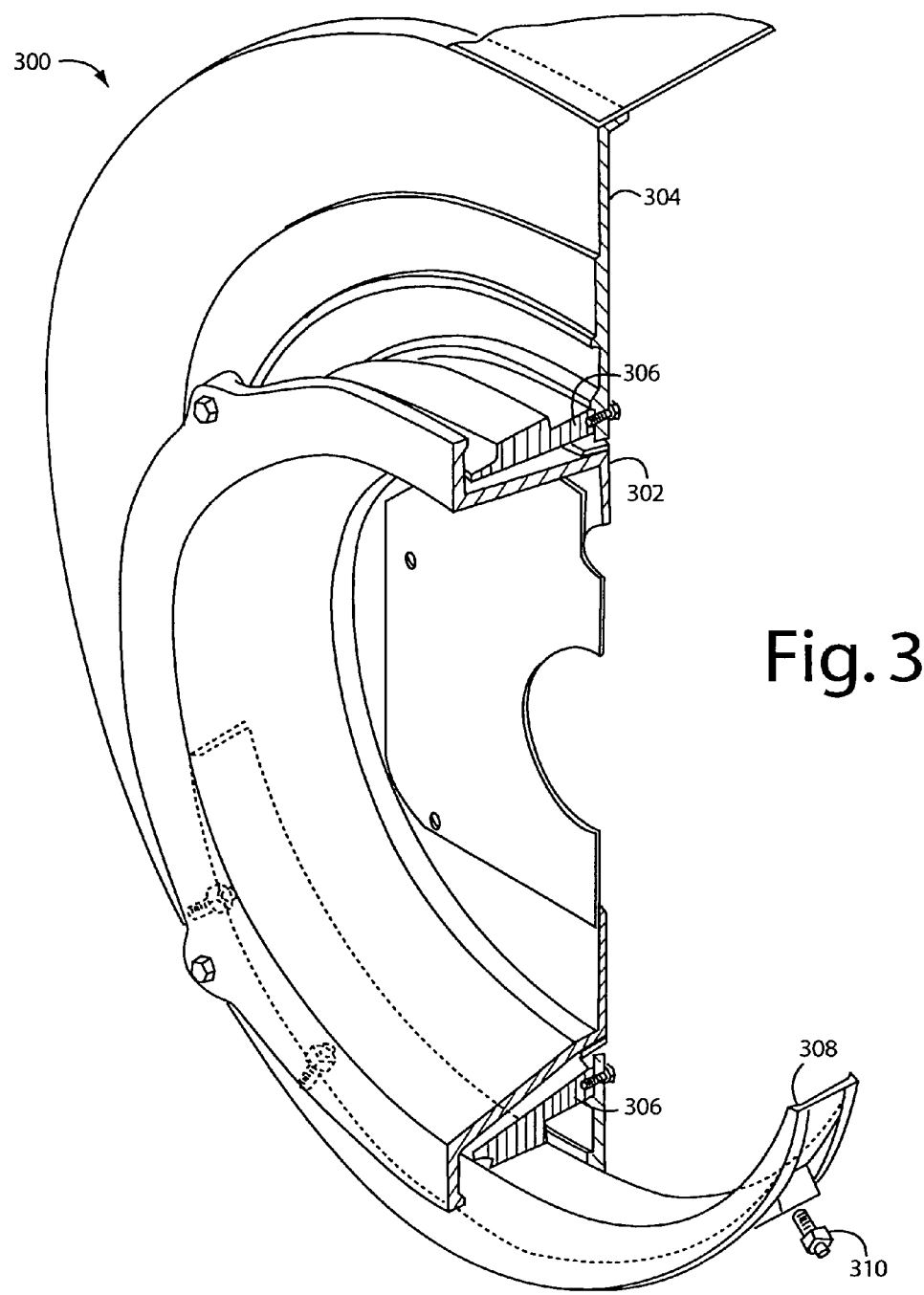
FIG. 3 is a partial cutaway and perspective view diagram of one end of the coffee roaster embodiment of the present invention of FIG. 1, e.g., before it was retrofitted with the roller bearings and rocker arms as shown best in FIG. 2.

FIG. 3 represents the Burns Roaster embodiment of the present invention of FIG. 1 before it was retrofitted with the roller bearings and rocker arms as shown in FIG. 2. Such is referred to herein as coffee roaster 300 and comprises a back disk 302 that turns with a cylinder 304 inside an oven. A circular journal ring 306 turns on a stationary shoe-type Babbitt bearing 308.

An oiler lubricates the Babbitt bearing 308, and is fixed to the oven. Four set-screw height adjustments, e.g., as represented by a set-screw 310, can adjust the axis of rotation of cylinder 304. This shoe-type Babbitt bearing 308 is subject to rapid wear, especially if maintenance personnel do not keep it properly oiled. Once the periodic lubrication fails, the circular journal ring 306 can also be catastrophically involved and it too will need replacement. A new type of journal ring must be used that includes journal races which are much harder and higher quality steel than the roller bearing wheels of FIG. 2, e.g., wheels 201–204. So the initial cost is higher, but savings are realized in the future when only the roller bearings need replacing.

Figure 4A:
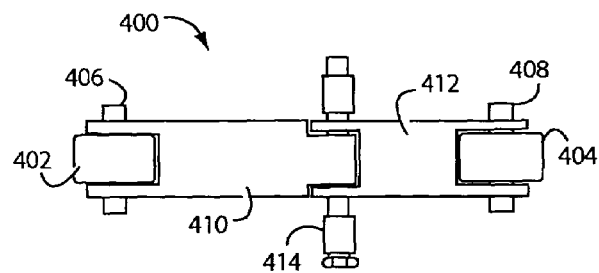
FIGS. 4A, 4B, and 4C are respectively top, side, and perspective view diagrams of the roller bearings and rocker arms as shown best in FIG. 2.
Figure 4B:
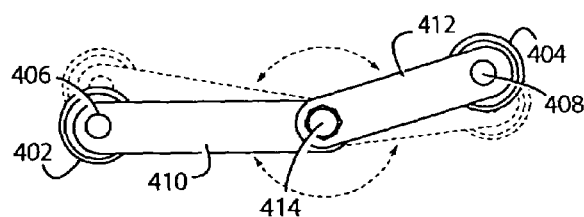
Figure 4C:
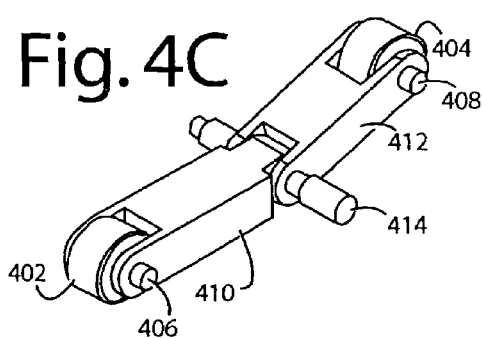

FIGS. 4A, 4B, and 4C are respectively top, side, and perspective view diagrams of the roller bearings and rocker arms as shown in FIG. 2. A pair of roller bearing wheels 402 and 404 are respectively mounted on axles 406 and 408 to rocker arms 410 and 412. A center pivot 414 allows each rocker arm 410 and 412 to swing up and down under a set-screw adjustment that bears in the middle of the arms.

In general, coffee roaster embodiments of the present invention include an oven for providing hot air convection and radiant heat used to roast coffee beans in a batch, and have opposite end walls. A roasting drum turns on a horizontal axis within the oven to tumble coffee beans while roasting and to even out differences in coffee bean heating. A pair of bearing journals, are each one fitted at a corresponding one of an end of the roasting drum, and they each fit within the opposite end walls of the oven. A first and second set of four rollers each receive the turning weight of the roasting drum by riding along the bearing journals. Thus, each roller in a set of four roller wheels is height adjustable at roughly a 4-o'clock, a 5-o'clock, a 7-o'clock, and an 8-o'clock position to enable the lateral and vertical repositioning of the roasting drum in the oven. A plurality of rocker arms can each be fitted at a distal end with one of the rollers, and pivotably attached by its near end to a lower part of the end walls of the oven below a corresponding drum opening. A corresponding set of adjustment screws can be included to each engage a middle position of a respective rocker arm, and that in combination, provide for the lateral and vertical repositioning of the roasting drum in the oven.

Coffee roasters can be constructed of all new components, or original coffee roasters, such as the 1915 Burns Roaster, can be retrofitted and refurnished to include the first and second set of four rollers that each receive the turning weight of the roasting drum by riding along the bearing journals.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A coffee roaster, comprising:
   an oven for providing conventional and radiant heat used to roast coffee beans in a batch, and having opposite end walls;
   a roasting drum which turns on a horizontal axis within the oven to tumble coffee beans while roasting and to even out differences in coffee bean heating;
   a pair of bearing journals, each one fitted at a corresponding end of the roasting drum, and such that they each fit within said opposite end walls of the oven; and
   a first and second set of four rollers each that receive the turning weight of the roasting drum by riding along the bearing journals;
   wherein, each said roller in a set of four roller wheels is height adjustable at roughly a 4-o'clock, a 5-o'clock, a 7-o'clock, and an 8-o'clock position to enable the lateral and vertical repositioning of the roasting drum in the oven.

2. The coffee roaster of claim 1, further comprising:
   a plurality of rocker arms each fitted at a distal end with one of said rollers, and pivotably attached by its near end to a lower part of said end walls of the oven below a corresponding drum opening.

3. The coffee roaster of claim 2, further comprising:

a corresponding set of adjustment screws that each engage a middle position of a respective rocker arm, and that combinationally provide for said lateral and vertical repositioning of the roasting drum in the oven.

4. A method of restoring a coffee roaster, comprising:

removing a roasting drum from a coffee roasting oven which turns on a horizontal axis within the oven to tumble coffee beans while roasting and to even out differences in coffee bean heating;

removing an original shoe-type Babbitt bearing from said coffee roasting oven that received the turning weight of the roasting drum through a journal ring; and installing a set of four rollers to each receive said turning weight of the roasting drum by riding along said journal ring;

wherein, bearing lubrication maintenance is no longer required.

5. The method of claim 4, wherein the step of installing is such that each said roller in a set of four roller wheels is height adjustable at roughly a 4-o'clock, a 5-o'clock, a 7-o'clock, and an 8-o'clock position to enable a lateral and vertical repositioning of the roasting drum in the oven.

6. The method of claim 4, further comprising:

mounting a plurality of rocker arms each fitted at a distal end with one of said rollers, and pivotably attached by its near end to a lower part of an end wall of the oven below a corresponding drum opening.

7. The method of claim 6, further comprising:

using a corresponding set of adjustment screws to each engage a middle position of a respective rocker arm, and to combinationally provide for a lateral and vertical repositioning of the roasting drum in the oven.

* * * * *